W. P. BREEDING.
Galvanizing Pipes and Tubing.

No. 222,655. Patented Dec. 16, 1879.

Witnesses:
A. P. Grant,
W. F. Kircher

Inventor:
W. P. Breeding,
by John A. Wiedersheim
ATTORNEY.

UNITED STATES PATENT OFFICE.

WILLIAM P. BREEDING, OF PHILADELPHIA, PENNSYLVANIA, ASSIGNOR OF ONE-HALF OF HIS RIGHT TO CALEB H. HORNE, OF SAME PLACE.

IMPROVEMENT IN GALVANIZING PIPES AND TUBING.

Specification forming part of Letters Patent No. 222,655, dated December 16, 1879; application filed June 26, 1879.

*To all whom it may concern:*

Be it known that I, WILLIAM P. BREEDING, of the city and county of Philadelphia, and State of Pennsylvania, have invented a new and useful Improvement in Galvanizing Pipes and Tubing, which improvement is fully set forth in the following specification and accompanying drawings, in which—

Figure 1:
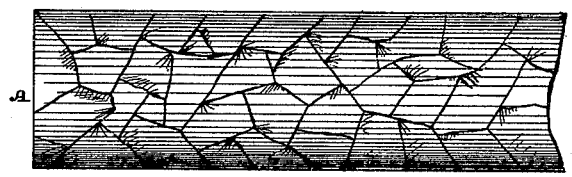
Figure 2:
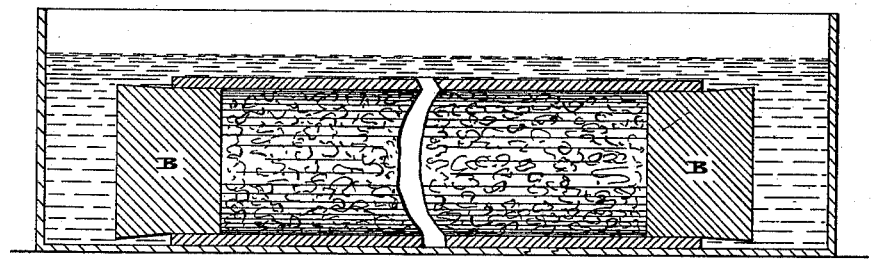
Figure 3:
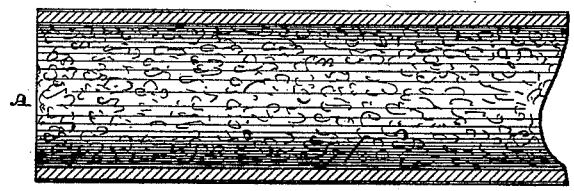

Figure 1 is a side elevation of a piece of pipe embodying my invention. Fig. 2 is a longitudinal section of said piece, closed at both ends by stoppers or caps. Fig. 3 is a similar view of said piece with the stoppers or caps removed.

Similar letters of reference indicate corresponding parts in the several figures.

For some arts and industries it is essential that a pipe or tube galvanized on its exterior has its interior surface uncoated or non-galvanized, to accomplish which is the object of my invention. For this purpose I prevent the removal of the scale, &c., from the inner surface of the pipe or tube, while such removal is accomplished on the exterior surface thereof, whereby, when the pipe or tube is subsequently subjected to the action of the coating metal, the inner surface will not be coated, while the outer surface is properly coated or galvanized.

Referring to the drawings, A represents a piece of iron pipe or tube, which is galvanized on its exterior surface and not galvanized on its interior surface, such pipe being employed for several purposes, such as underground telegraphy, ice-machines, &c.

In order to accomplish this result of galvanized and non-galvanized surfaces, the iron pipe, as it comes from the mill, and as is well known, has its outer and inner surfaces covered with scale, grease, &c., is closed at both ends by stoppers or caps B, and thus immersed in the acid bath, the effect whereof is to remove the scale, &c., from the exterior surface only. The pipe is now withdrawn from the bath, and the stoppers or caps are removed from the pipe, which latter is then subjected to the action of the coating metal.

It will be seen that the inner surface of the pipe will not galvanize, owing to the existing or unremoved scale and impurities, while the outer surface will be galvanized, as usual, whereby the pipe or tubing is prepared as desired—viz., with a galvanized exterior surface and a non-galvanized interior surface, and, for general purposes, a cheap galvanized pipe is produced.

Having thus described my invention, what I claim as new, and desire to secure by Letters Patent, is—

The improvement in galvanizing pipe or tubing, whereby its exterior surface is galvanized and its interior surface left non-galvanized, the same consisting in closing both ends of the pipe or tubing, and then subjecting it in such condition primarily to the acid bath, substantially as and for the purpose set forth.

WM. P. BREEDING.

Witnesses:
JOHN A. WIEDERSHEIM,
A. P. GRANT.